Feb. 22, 1955 L. E. MATSON, JR 2,702,900
CORNER REFLECTOR
Filed May 12, 1953

*INVENTOR.*
LESLIE E. MATSON JR
BY
*Harry M. Saragovitz*
*Attorney*

United States Patent Office 2,702,900
Patented Feb. 22, 1955

2,702,900

CORNER REFLECTOR

Leslie E. Matson, Jr., Collingswood, N. J., assignor to the United States of America as represented by the Secretary of the Army Application May 12, 1953, Serial No. 354,547

9 Claims. (Cl. 343—18)

This invention relates to improvements in meteorological reflecting targets, and more particularly to that type of target which is designed to be attached to a balloon and sent aloft for upper wind observations and radar calibrations, and which is used with radar equipment to determine the direction and velocity of winds aloft.

One type of balloon-borne target is constructed of corner reflectors to reflect radio waves so that a radar can track it. It has been found that under certain conditions, such a target tends to remain orientated in positions of low reflectivity for long periods of time, whereby it is lost by the tracking radar.

One of the objects of this invention is to provide a meteorological, balloon-borne target which tends to continuously rotate whereby it is prevented from remaining in orientations of low reflectivity.

Another object of this invention is to provide a meteorological balloon-borne target having means for directing air spirally as the target is lifted.

In accordance with this invention, means, such as vanes, are provided to insure continuous rotation of the target and prevent it from remaining orientated in positions of low reflectivity. These vanes are supported by strings, which also serve to strengthen the target and prevent it from collapsing during turbulent gusts.

Figure 1:
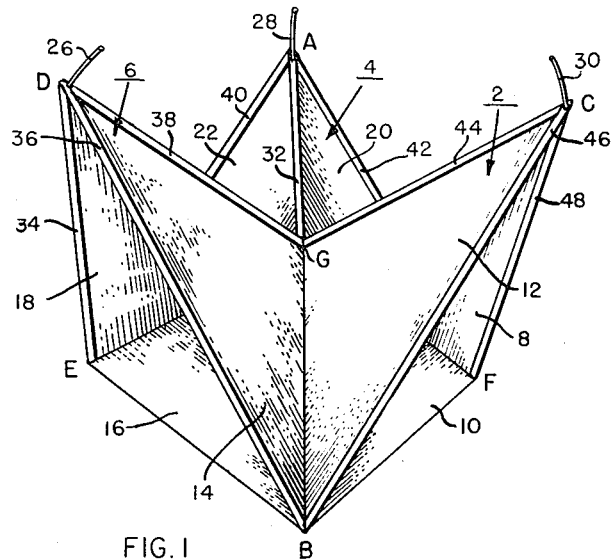
Figure 2:
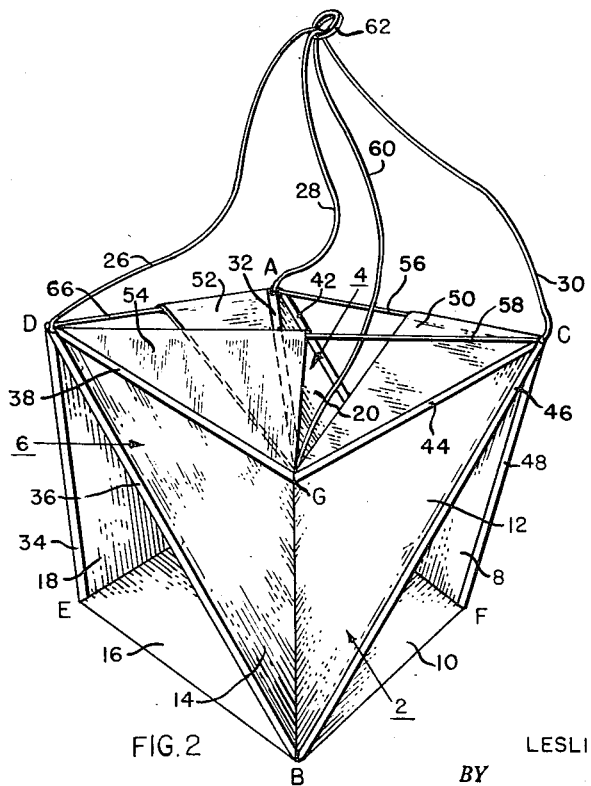

For a better understanding of the present invention together with other and further objects thereof, reference is had to the following descriptions taken in connection with the accompanying drawings, in which:

Fig. 1 is a perspective view of a prior art meteorological balloon-borne target; and, Fig. 2 is a perspective view illustrating an improved target built in accordance with this invention.

Trihedral reflectors, also known as corner reflectors, comprise three plane reflecting elements mounted in mutually perpendicular relationship to form a trihedral angle. The principal property of a trihedral reflector is that any incident ray, provided it is reflected by each of three plane elements of the reflector in succession, emerges from the reflector after the third reflection in a direction parallel to its direction of incidence. By virtue of this property a ray incident upon the reflector from any direction may be reflected back toward its source. However, the intensity of the received reflected rays is determined by the angle that the impinging incident rays make with the plane elements.

Reference is now made to Fig. 1, which illustrates the prior art reflector composed of three corner reflectors 2, 4 and 6. Reflector 2 is composed of three triangular, orthogonally-related, metallized paper elements 8, 10, and 12. Reflector 6 also is composed of three triangular orthogonally-related metallized paper elements 14, 16 and 18. Reflector 4 as illustrated, shows only two of the three triangular orthogonally-related metallized paper sides 20 and 22; the third side being hidden behind reflectors 2 and 6. Reflectors 2, 4 and 6 are joined to each other so as to form a common vertex at G. When the reflectors are joined together the intersection of elements 10 and 12 are joined to the intersection of elements 14 and 16 along line B—G. In a similar manner the intersection of elements 16 and 18 are joined to the intersection of element 22 and the hidden element of reflector 4 along line E—G. Also, the intersection of elements 8 and 10 are joined to the intersection of element 20 and the hidden plane element of reflector 4 along line F—G.

The three reflectors 2, 4 and 6, when joined together as described above, form a fourth corner reflector opening downward and having elements 10, 16, and the hidden element of reflector 4. Elements 10, 16, and the hidden element of reflector 4 are also mutually perpendicular to each other in a manner similar to the elements of the other three corner reflectors. Each of the three corner reflectors, therefore, has one element in common with the fourth corner reflector.

The resulting configuration of the target is such that the fourth corner reflector, which is formed by the three corner reflectors joined as set forth above, opens downward and the other three corner reflectors open outward and slightly downward. The resultant figure is such that if another corner reflector were added pointing upward to the three corner reflectors, the sides of this other corner reflector would complete the structure, thereby producing eight complete corner reflectors.

The target is adapted to be connected to a balloon, not shown, by strings 26, 28 and 30, respectively attached to the reflector at points A, C and D. The target is also provided with wood struts which are placed in a hem along some of the edges of the target. A strut 32, placed in a hem of reflector 4 and reflectors 2 and 6, extends from A to B passing through apex G and is attached to all three corner reflectors of the target. Reflector 6 has strut 34 placed in a hem between points D and E, strut 36 placed in a hem between D and B, and strut 38, placed in a hem between point D and apex G. In a similar manner, reflector 2 has strut 48 between C and F, strut 46 between C and B, and strut 44 between C and apex G. Also, reflector 4 has strut 40 between A and E, and strut 42 between A and F. The aforementioned struts, usually made of balsa wood, support the sides of the target.

Reference is now made to Fig. 2, which illustrates the same target reflector as Fig. 1, with the features of this invention added. Similar elements in Figs. 1 and 2 are identified with the same reference characters. Elements 22 and 40 of Fig. 1 are not shown in Fig. 2 solely for the purpose of clarity.

In order to prevent the target from remaining orientated in any given position, triangular vanes 52, 54 and 50 are added thereto. These vanes, as shown, add substantially half of each surface of the missing upwardly directed corner reflector. One edge of vane 50 is attached to strut 44, and the other edge is attached to a taut string 56 connected between points A and C. In a similar manner vane 52 is attached to a taut string 66, connected between points A and D of the standard target, and wood strut 32 which is in a hem of the target between points G and A. Similarly, vane 54 is supported by a taut string 58, connected between points C and D, and wood strut 38 which is in a hem of the target between points G and D.

The strings together with the vanes also serve to strengthen the target and prevent it from collapsing as a result of turbulent wind gusts, or when it falls after the balloon bursts.

In addition to the strings shown in Fig. 1, a fourth string 60 is shown connected to apex G. Strings 26, 28, 30 and 60 are connected to a ring 62 which is used to attach the target to the balloon.

The three paper vanes fastened by means of the taut strings and wood struts impart a spiral motion to the air through which the target is rising. The resulting torque on the target makes it continuously rotate in a direction opposite to the spiral motion imparted to the air. When the target is constructed with vanes as set forth by this invention it can be lifted in a calm atmosphere without having the target remain orientated in positions of low reflectivity. The coaction between the vanes and the movement of the balloon will cause a spiral motion to be imparted to the target, thereby causing it to continuously rotate.

Since many apparently widely different embodiments of this invention may be made without departing from the spirit and scope thereof, it is to be understood that the invention is not limited to its specific embodiment, but only by the appended claims.

What is claimed:

1. In combination with a meteorological balloon-borne target having first, second, and third similar corner reflectors, each of said reflectors having a first, second and third edge, each of said reflectors being joined to the other two reflectors at its apex, said first edge of each of said reflectors being joined to said second edge of one of the other of said reflectors so that one of the outer faces of each of said reflectors forms a respective face of a fourth corner reflector: air current responsive means coupled to the third edge of each of said reflectors for rotating said target as said target is drawn through the atmosphere.

2. The combination according to claim 1, wherein said air current responsive means comprises a vane connected to the third edge of at least one of said reflectors.

3. The combination according to claim 2, further including a string stretched between the third edges of at least two of said corner reflectors for supporting said vane and strengthening said target.

4. The combination according to claim 1, wherein said air-current responsive means includes a first string stretched between the third edges of said first and second corner reflectors, a second string stretched between the third edges of said second and third corner reflectors and a third string stretched between the third edges of said first and third corner reflectors, and a vane attached between each string and the adjacent third side of each corner reflector.

5. The combination according to claim 4, wherein the surface area of each vane is approximately half of the area of one of the surfaces of each corner reflector.

6. The combination of a meteorological balloon-borne target comprising first, second and third similar corner reflectors, each of said reflectors having a first, second and third edge, each of said reflectors being joined to the other two reflectors at its apex, said first edge of each of said reflectors being joined to said second edge of one of the other reflectors so that one of the outer faces of each of said reflectors forms a respective face of a fourth corner reflector, and air current responsive means coupled to the third edge of each of said reflectors for imparting rotary movements to said target when it is caused to pass through the atmosphere, comprising first, second and third vanes, each of said vanes having at least two edges, one edge of each of said vanes being fixedly connected to a respective third edge of each of said reflectors, a string interconnecting said third edges for preventing the target from collapsing, the other edge of said vane elements being supported by said string, thereby positioning said vane elements relative to said target so as to impart a rotary movement to said target.

7. The combination according to claim 6, wherein the surface area of each vane is approximately one half of the surface area of one of the surfaces of each corner reflector.

8. In combination with a meteorological, balloon-borne, radio-wave-reflecting target consisting of three similar corner reflectors joined in such a manner as to form a fourth corner reflector, each of said corner reflectors when so joined having one edge free of any connection to one of the other corner reflectors, a string stretched between and attached to said free edge of each of said corner reflectors, three triangularly shaped vanes, each of said vanes being attached to said string at one side and to one of said free edges at another side, whereby said target is caused to continuously rotate.

9. The combination according to claim 8, where the surface area of each of said vanes is approximately half of the area of one of the surfaces of each of said corner reflectors.

References Cited in the file of this patent

UNITED STATES PATENTS

| | | |
|---|---|---|
| 2,115,788 | Scharlau | May 3, 1938 |
| 2,462,102 | Istvan | Feb. 22, 1949 |